United States Patent [19]

Yamada

[11] 4,183,717
[45] Jan. 15, 1980

[54] WINDMILL STRUCTURE

[76] Inventor: Motohiro Yamada, 666-4, Kotoniyojo 6-chome, Nishi-ku, Sapporo-shi, Hokkaido, Japan

[21] Appl. No.: 883,315

[22] Filed: Mar. 3, 1978

[30] Foreign Application Priority Data

Mar. 10, 1977 [JP] Japan ................................ 52/26263

[51] Int. Cl.² ............................................. F03D 7/04
[52] U.S. Cl. .................................... 416/121; 416/142
[58] Field of Search ................. 416/121 A, 12, 16, 37, 416/41, 142, 132 B

[56] References Cited

U.S. PATENT DOCUMENTS

| 1,963,912 | 6/1934 | Honnef | 416/121 A |
| 2,094,917 | 10/1937 | Dunn | 416/16 |
| 2,140,152 | 12/1938 | Dunn | 416/16 |
| 2,178,047 | 10/1939 | Malme | 416/16 |
| 2,388,377 | 11/1945 | Albers | 416/121 A |

FOREIGN PATENT DOCUMENTS

| 535625 | 1/1932 | Fed. Rep. of Germany | 416/121 A |
| 2558848 | 9/1976 | Fed. Rep. of Germany | 416/41 |
| 462320 | 1/1914 | France | 416/132 B |

Primary Examiner—Everette A. Powell, Jr.
Assistant Examiner—A. N. Trausch, III
Attorney, Agent, or Firm—Fleit & Jacobson

[57] ABSTRACT

A windmill structure in which a combined structure of sails and electrical generator device is pivotally suspended so that the position of the combined structure may be shifted in accordance with the wind velocity.

7 Claims, 9 Drawing Figures

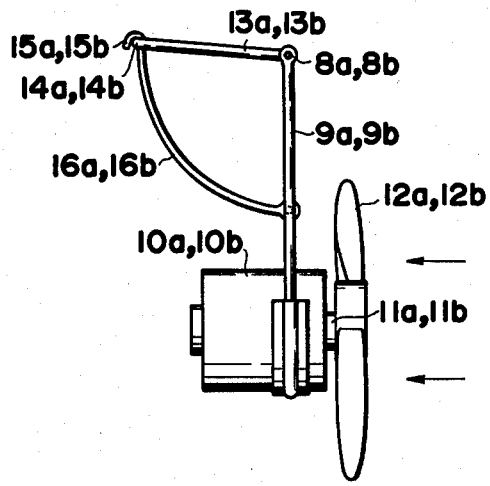
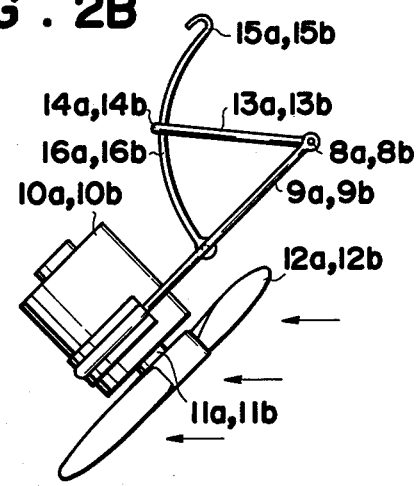
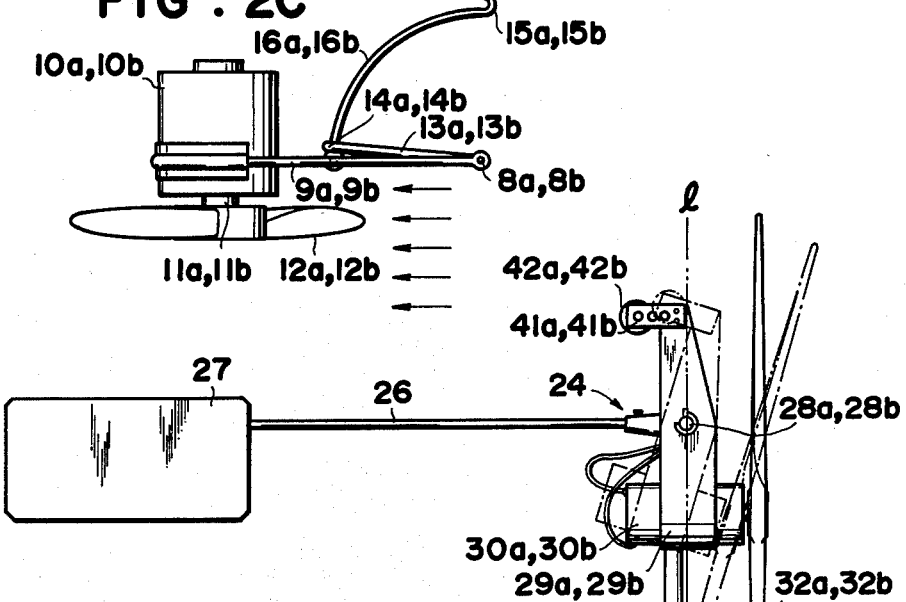

WINDMILL STRUCTURE

BACKGROUND OF THE INVENTION

The present invention relates to a windmill structure and more particularly to a windmill used primarily for converting wind energy to mechanical and/or electrical energy.

The wind energy has hardly been utilized effectively nowadays although the same is one of the greatest sources of energy obtainable on the earth. This is due to the fact that it is quite difficult to utilize the wind energy mainly because the wind changes so often both in wind direction and wind velocity. It is apparent that the wind contributes to a mankind as a clean and indefinite energy source if it could be effectively converted to other energies such as an electrical power.

In order to utilize a wind energy as a stable energy source, it is material to provide a windmill power generator device, which converts the wind energy to a mechanical or rotational energy and then to an electrical energy, and a device for storing the thus obtained electrical energy. One of the greatest problems inherent to the windmill power generation is a structure of a windmill, because an output of a windmill varies in a square ratio of the diameter of sails, or wind-engaging blades, of the windmill and in a cubic ratio of the wind velocity. Thus, the windmill which is constructed for the purpose of utilizing a general wind velocity of about 4–5 m/sec. will generate a hundred times of the output in case of the strong wind such as a typhoon or the like. On the other hand, a windmill manufactured solid enough to withstand a strong wind will hardly operate in a general case of the wind velocity of about 4–5 m/sec. or less.

An attenpt has been made to solve these probelms by providing a windmill in which a pitch or twist of the sails is varied in accordance with a wind pressure received by the sails of the windmill. However, such an adjustable pitch type windmill is extraordinarily complex in structure, and therefore it does not meet with economical requirements. Further, it is likely that the sails are broken or damaged due to a "flutter" which is a vibration generated at a change of the wind direction.

SUMMARY OF THE INVENTION

Accordingly, an object of the present invention is to provide a windmill structure which allows a constant sail rotation regardless of the wind velocity.

Another object of the present invention is to provide a windmill structure which maintains a constant electrical generation in case of a strong wind.

Another object of the present invention is to provide a windmill structure which allows a constant electrical generation even when the wind is weak.

A further object of the present invention is to provide a windmill structure which is simple in structure and meets with an economical requirement.

Another object of the present invention is to provide a windmill which can immediately follow a change of the wind direction.

Another object of the present invention is to provide a windmill structure which can stand for a strong wind.

Briefly, the windmill structure of the present invention provides a combined structure of an electrical generator device and sails. The combined structure is pivotally suspended so that the position of the combined structure may be shifted in accordance with the wind velocity.

The applicant has arrived, after trials and errors for more than 40 years, at a conclusion that a windmill should have a structure so that a constant wind pressure is received by sails of the windmill regardless of the wind velocity. The present invention is based upon the above viewpoint and has been completed.

The windmill of the present invention is simple in structure, and the applicant believes that simplicity is the soul of the windmill. One of the most difficult problems to be solved in the field of a wind energy utilization system is an economic aspect. In order to obtain the same output from a windmill as from a watermill, the windmill should be about 800 times larger than the size of the watermill since an air density is about 1/800 of a water density. Accordingly, a special attention should be taken to a windmill structure so that a minimum manufacturing material may be able to provide a maximum effect of the wind energy.

Other objects and features of the present invention will become apparent from the detailed description of preferred embodiments thereof, which will be read with the accompanying drawings.

DESCRIPTION OF THE DRAWINGS

FIGS. 2A, 2B and 2C are side views of a principal portion of the windmill, showing that a combined structure of an electrical generator device and sails is pivoted in accordance with the wind velocity;

FIGS. 5 and 6 are explanatory side views of a principal portion of the windmill shown in FIG. 4.

DETAILED DESCRIPTION OF THE PREFERRED EMBODIMENTS

Figure 1:
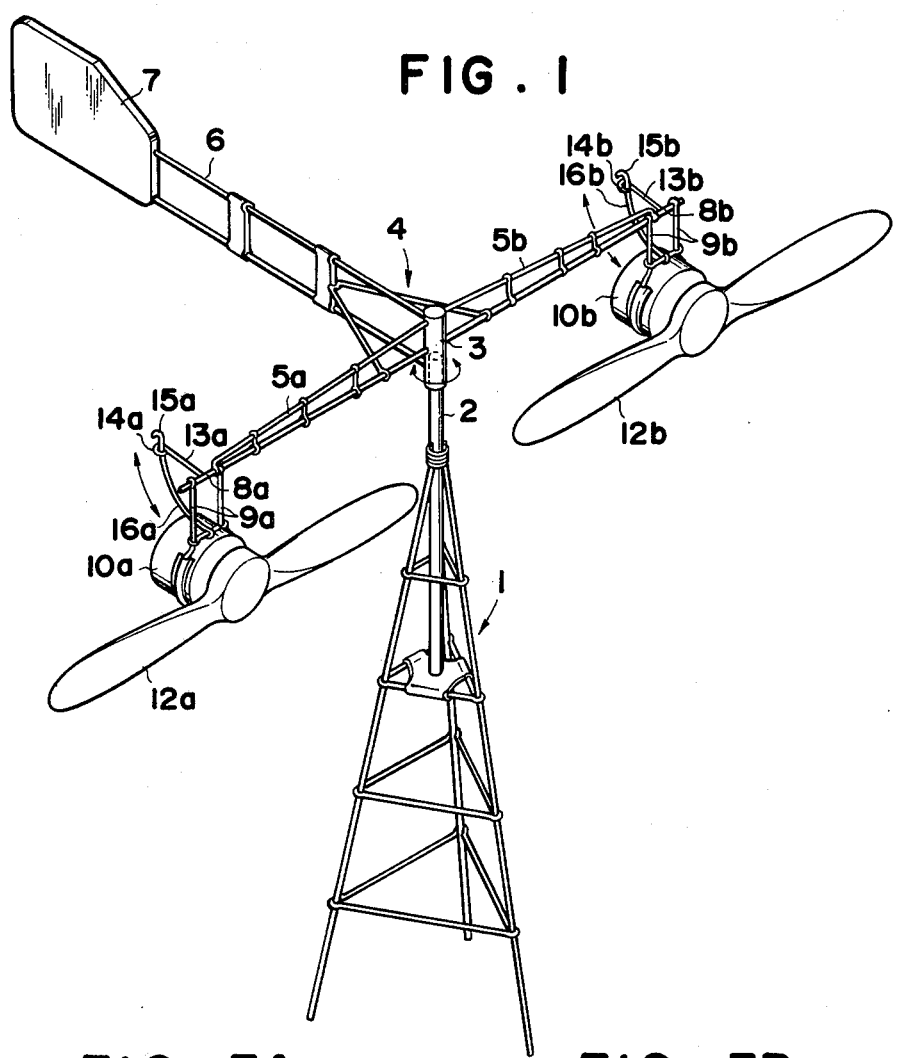
FIG. 1 is a perspective view of a windmill structure in accordance with a first embodiment of the present invention.

Referring first to FIG. 1 which shows a simplified structure of the windmill of the present invention, a tower 1 is constructed in such a manner as illustrated. Extending vertically upwardly from the tower 1 is a tubular shaft 2 from which extends rotatably a rotating collar 3. Extending horizontally from the collar is a T-shaped body 4 which is designed in a skeletal manner and has a tail body 6. Connected to opposite sides of the collar 3 are arms 5a, 5b which extend substantially horizontally from the collar 3. Thus, arms 5a, 5b are rotatable together with collar 3 about an axis of the tubular shaft 2. The tail body 6 is connected to the collar 3 and to the arms 5a, 5b such that the tail body 6 extends from the collar 3 with right angles to the lengthwise direction of the arms, as illustrated. The tail body 6 has a vertical planar vane 7 at the end thereof, which is disposed so as to capture wind and rotates the collar 3, thereby rotates the position of the windmill and allows an immediate pivotal movement of the arms 5a, 5b about the tubular shaft in accordance with the direction of the wind.

At the end of the arms 5a, 5b, which is indicated by reference numeral 8a and 8b, are swingably or pivotably disposed members which are referred to as pivot members 9a, 9b. The pivot members 9a, 9b are connected to electrical generator devices 10a, 10b respectively, so that the electrical generator devices are firmly secured to the pivot members 9a, 9b. The electrical generator devices 10a, 10b will not be described in detail since the known devices can be utilized. Connected to rotary shafts 11a, 11b of the electrical generator devices 10a, 10b are sails 12a, 12b which are formed like an airplane propeller as illustrated. Thus, the combined structure of the sails 12a, 12b and the electrical generator devices 10a, 10b are swingably or pivotally connected to the ends of the arms 5a, 5b so that the combined structure is pivoted in the rearward direction. In the illustrated embodiment the number of sails is two, but it will be understood that any suitable number of sails may be utilized. Furthermore, the illustrated embodiment shows the sails as being substantially airplane propeller shaped, but other configurations may be utilized without departing from the spirit and scope of the invention.

Figure 3A:
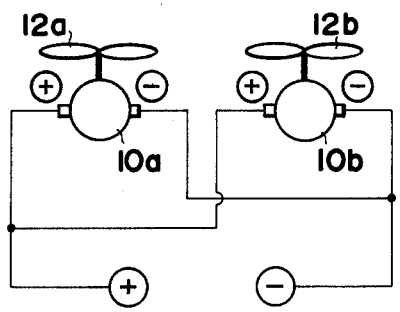
FIGS. 3A and 3B are circuit diagrams applicable to the windmill structure of the invention.
Figure 3B:
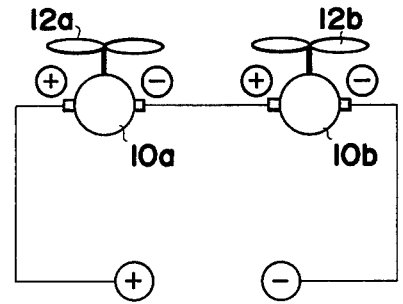

Extending rearwardly horizontally from the end portions 8a, 8b of the arms 5a, 5b are members 13a, 13b which have guide rings 14a, 14b at the ends thereof. Guide members 16a, 16b, which are in the shape of a quarter circular arc and have hooks or stoppers 15a, 15b at the ends thereof, are extended from the pivot members 9a, 9b. The guide members 16a, 16b are slidably held by the guide rings 14a, 14b of the members 13a, 13b so that the guide members may move through the guide rings 14a, 14b. The circular arc shaped guide members 16a, 16b in the illustrated embodiment are quadrant arcs. Thus, a pivotal or swinging movement of the electrical generator devices 10a, 10b with the sails 12a, 12b is limited to an extent of about 90°, that are from the position of FIG. 2A to the position of FIG. 2C. However, the elements for limiting the swinging movement is not prerequisite to the present invention. Outputs of the electrical generator devices are obtained through lead wires (not shown) which are disposed along the arms 5a, 5b and within the tubular shaft 2 for connection to any suitable electrical utilization source such as a battery to be charged. The electrical generator devices 10a, 10b are electrically connected whether in series or parallel as shown in FIGS. 3A and 3B in accordance with various requirements/conditions of electrical generation of the windmill. Further, a gear box (not shown) may be provided between the sails 12a, 12b and the generator devices 10a, 10b.

An operation of the windmill structure shown in FIG. 1 is described with reference to FIGS. 1, 2A, 2B and 2C. When the wind rises, the T-shaped body 4 is horizontally rotated or pivoted about the tubular shaft 2 by an effect of the vane 7 so that the sails 12a, 12b face against, or encounter, the wind. The sails 12a, 12b, which are connected to the electric generator devices 10a, 10b through the rotary shafts 11a, 11b, are rotated against the wind direction in case of a weak wind or breeze, as illustrated in FIG. 2A. In case that the wind is stronger, the combined structure of the sails 12a, 12b and the generator devices 10a, 10b is pivoted rearwardly by the wind as illustrated in FIG. 2B, and a rotation of the sails is maintained at the position where the wind pressure is balanced with the weight of the combined structure of sails and generator devices. In a case that the wind is much stronger such as gale or storm, the position of the combined structure of sails 12a, 12b and generator devices 10a, 10b is further shifted upwardly from the position of FIG. 2B to a position where the sails are rotated with the rotary shafts being vertical as illustrated in FIG. 2C while the sails are being rotated. Thus, the area of the sails 12a, 12b which receive the wind is increased or decreased automatically in accordance with the wind velocity, and receives substantially in accordance with the wind velocity, and receives substantially a constant wind pressure. Therefore, the rotation of the sails are maintained as being constant.

Since the axis of the pivotal movement of the combined structure is positioned above the pivot members 9a, 9b, the electrical generator devices 10a, 10b are not affected by a reaction of gyromoment induced by the rotation of the sails 12a, 12b. This structure allows prevention of damage or break at the rotary shafts of the electrical generator devices. Further, the structure in which two sails and generator devices are pivotally suspended in a symmetrical relation allows an economical manufacture of the tower 1. In addition, the wind pressure received by the pivotable sails is maintained constant regardless of the wind velocity, and therefore simple structure of the tower can be utilized. Furthermore, since the T-shaped body 4 is pivoted immediately about the collar 3 when the wind shifts to another direction, fluttering due to a reaction of gyromoment in case of a change of the wind direction can be prevented.

It may be possible to remove the tail body 6 and the planar vane 7 because a moment of force is naturally produced and affected to the arms 5a, 5b to urge the sails 12a, 12b to face against the wind direction. However, it was found that the vane 7 facilitated an immediate pivotal movement of the T-shaped body 4 particularly at the initial stage of the wind blowing.

Figure 4:
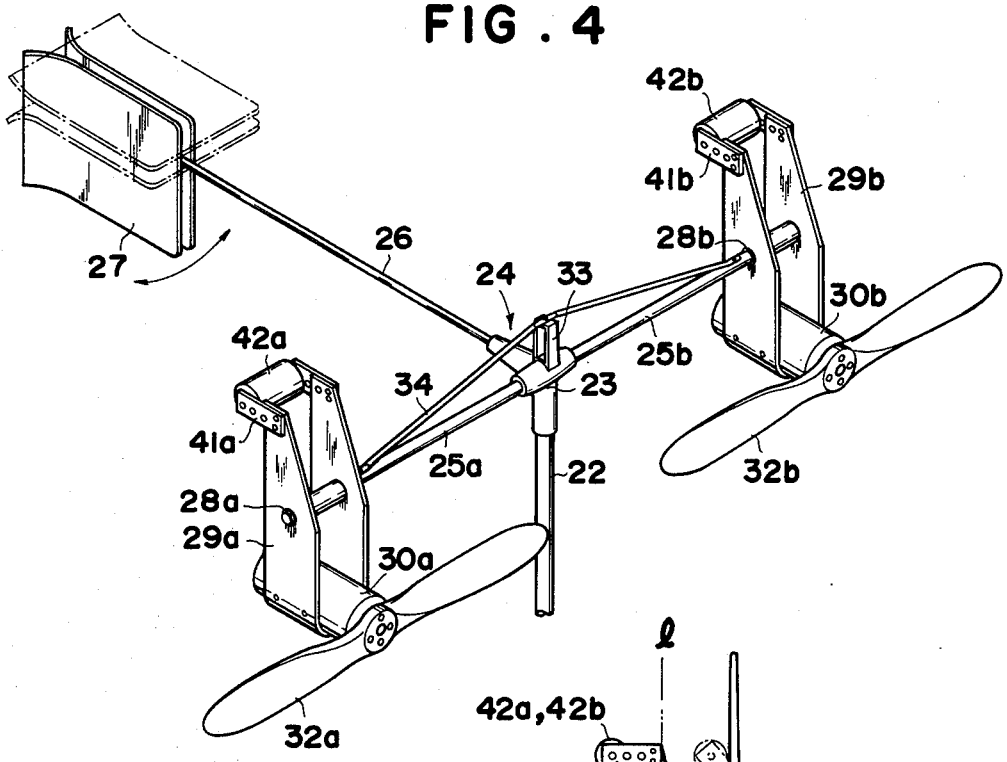
FIG. 4 is a perspective view of a windmill structure in accordance with a second embodiment of the present invention.

Referring now to FIG. 4 which shows another embodiment of the present invention, a T-shaped body which is generally indicated at 24 is rotatably engaged, by means of a collar 23, with a tubular shaft 22 which is tightly secured in a vertical posture by a tower (not illustrated). The T-shaped body 24 comprises arms 25a, 25b and a tail body 26 having a vane 27. The T-shaped body 24 may be replaced by the T-shaped body 4 of the first embodiment shown in FIG. 1, or may be designed to any other configurations. On top of the collar 23 is provided a protrusion 33 for reinforcing and maintaining the balanced and horizontal position of the arms 25a, 25b by means of a reinforcing member 34.

The vane 27 has two panels symmetrically disposed at the rear end portion of the tail body 26. The vane is pivotally connected with the tail body 26, which is formed in the shape of a bar in this embodiment, by means of a bearing device (not shown) at the upper portion of the vane 27. The applicant has found it desirable to form the two panels curved outwardly at the rear end thereof as illustrated. This structure has proved that less fluttering was produced when the wind direction changed and that the structure facilitated an immediate pivotal or rotational movement when the wind direction changed. The vane 27 is pivotable and permits an immediate directional change of the T-shaped body 24, namely a rotation about the tubular shaft 22, even when there undergoes an abrupt and sudden change of the wind direction, because the vane 27 receives a violent sidewise or whirl wind and immediately pivots about the axis of the tail body 26 toward a horizontal position illustrated by phantom lines in FIG. 4 to avoid the full and direct pressure of the violent sidewise or whirl wind and then retracts to the original vertical posture. Therefore, the pivotable structure of the vane 27 facilitates an immediate and smooth directional change of the windmill.

Pivotal members 29a, 29b in this embodiment are formed in the shape of a plate in a U-shape whereas the first embodiment of FIG. 1 shows skeletal design. The pivot members are pivotally connected to the ends 28a, 28b of the arms 25a, 25b. Electrical generator devices 30a, 30b which have sails 32a, 32b are connected to the lower end of the pivotal members 29a, 29b, and counter balance weights 42a, 42b are connected to the upper portion of the pivotal members, respectively. The counterbalance weights are disposed at the rearward position with respect to the axis (28a, 28b) of the pivotal members 29a, 29b. The position of the counter balance weights 42a, 42b is adjusted by means of screws (not shown) and adjustment plates 41a, 41b each having a plurality of holes for securing the counter balance weights. Provision of the balancing weights is based upon the finding that the counter balance weights permit an immediate rotation, namely rotary shift, of the pivotal members between 30° and 90°, which are angular degrees from the initial stage of the operation, when the wind becomes a stronger but not so strong as a gale or storm. In other words, it was found that the pivotal members 29a, 29b do not move any further beyond the position of about 30° to an extent of 90° until an extraordinarily strong wind blows. Thus, it is not likely that a stable output can be obtained particularly when the wind velocity is of an order of intermediate scale, for example, 10-15 m/sec.

The adjustable counter balance weights 29a, 29b, which are adjustably positioned at the rearward position with respect to the axis of the pivotal members 29a, 29b, allow substantially a constant electrical generation because the combined structure of electrical generator devices 30a, 30b and sails 32a, 32b can be shifted to a suitable position in accordance with the wind velocity. To be more specific, when the sails 32a, 32b are in the position within about 30° from the position of normal or windless condition as illustrated by phantom lines in FIG. 5, the counter balance weights 42a, 42b are positioned at the back (namely, left hand side of the drawing) of a vertical line (l) of axis 28a, 28b, and therefore urge the combined structure or generator devices and sails to retract to the original position of windless condition, and prevent an excessive shift of the combined structure when the wind is weak, whereas the combined structure without counterbalance weights is likely to be shifted excessively, namely to an extent of about 30°, even when the wind is rather weak. Thus the sails are maintained in adjacent to the original position when the wind is rather weak, and therefore stronger output can be effectively obtained in case of the weak wind. When the wind is strong enough to urge the combined structure to shift more than about 30°, the counterbalance weights are shifted to the forward position of the vertical line (l) of axis 28a, 28b as illustrated by phantom lines of FIG. 6. Thus, the combined structure of generator devices and sails is pivoted rearwardly as illustrated by phantom lines. Accordingly an excessive increase of wind pressure onto the sails can be effectively and automatically prevented. Thus, the windmill structure with counterbalance weights presents a constant electrical output no matter what the velocity of the wind is.

Figure 6:
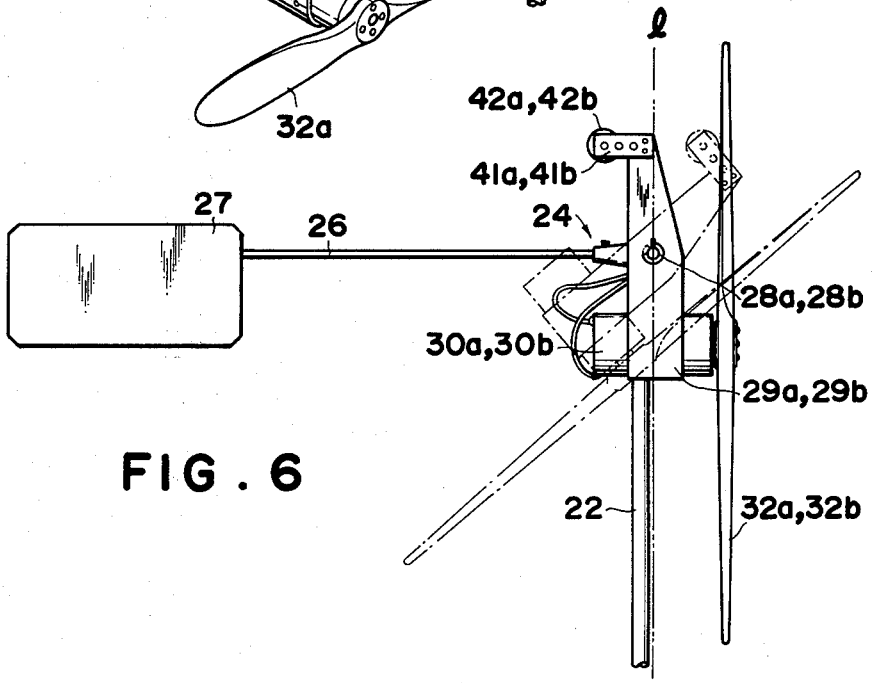

As described above, in the windmill structure of the second embodiment shown in FIGS. 4, 5 and 6 position of the sails is adjusted by changing the position of the weights, or by replacing the weights by other heavier or lighter weights. Accordingly, an output to be obtained can be adjusted. Further, the windmill is immediately positioned against the wind no matter what the wind direction is and even when the wind direction is uncertain, by means of the pivotable vane 27.

According to the present invention, the combined structure of electrical generator devices and sails is pivotably secured by the pivot members without any complex mechanism of a sail rotation adjustment device. Therefore, the windmill structure may be manufactured in a simpler fashion, and substantially a constant output can be obtained regardless of the wind velocity. In other words, sails area which receives the wind is automatically adjusted, namely increased or decreased, and always receives a constant pressure of the wind no matter what the velocity of the wind is, resulting in a constant rotation of the sails. Further, since the pivotal axis of the combined structure of electrical generator devices and sails is positioned away from the rotary shaft of the electrical generator devices, the rotary shaft is not influenced by a reaction of gyromoment which is due to the rotation of the sails, and there is no risk of any damage on to the rotary shaft of the electrical generator devices.

Although the present invention has been described with reference to the preferred embodiments thereof, many modifications and alterations maybe made within the spirit of the present invention. For instance, the sails and the T-shaped body may be modified into any other configurations, and additional electrical generator devices and sails may be provided so as to obtain larger power. Further, it is possible to provide a suitable device for relieving a rapid pivotal movement of the combined structure of electrical generator devices and sails.

What is claimed is:

1. A windmill structure comprising:
    a vertically extending tower;
    a horizontal structure rotatably supported on an upper portion of said tower and extending transversely thereof so that said horizontal structure is rotatable about an axis of said tower in accordance with a change of wind direction;
    pivot members having horizontal axes connected to said horizontal member at predetermined positions thereof so that said horizontal member is balanced with respect to the axis of said tower, said pivot members having lower portions positioned below the axes and upper portions positioned above the axes;
    electric generators mounted to the lower portions of each of said pivot members;
    sails rotationally connected to each of said electric generators; and
    weight members connected to upper portions of each of said pivot members, said weight members being mounted opposite to said sails relative to vertical planes which pass through the axes of said pivot members.

2. The windmill structure according to claim 1, in which a tail vane is connected to said horizontal structure at a right angle to a plane containing the axes of said pivot members.

3. The windmill structure according to claim 1, in which said pivot members each have a U-shaped member having a plurality of holes for adjustably securing said weight members at upper end portions thereof.

4. The windmill structure according to claim 1, in which said pivot members each have a U-shaped member with upwardly extending legs and two plates connected to upper ends of the legs of said U-shaped member and extending in a direction opposite to said sails, said plates each having a plurality of holes for adjustably securing thereto said weight members, said electric generators being mounted within a lower portion of said U-shaped members.

5. The windmill structure according to claim 2, in which said tail vane has a tail member connecting said tail vane to said horizontal structure, and a tail vane member pivotally connected to said tail member.

6. The windmill structure according to claim 2, in which said tail vane comprises two panels which are juxtaposed with each other, said panels being outwardly curved at one end thereof.

7. The windmill structure according to claim 1, wherein said weight members are releasably and adjustably connected to said pivot members.

* * * * *